(12) United States Patent
Ayala

(10) Patent No.: US 10,728,623 B2
(45) Date of Patent: Jul. 28, 2020

(54) EDITING TIMED-TEXT ELEMENTS

(71) Applicant: Home Box Office, Inc., New York, NY (US)

(72) Inventor: Hugo Ayala, Rye Brook, NY (US)

(73) Assignee: Home Box Office, Inc., New York, NY (US)

(*) Notice: Subject to any disclaimer, the term of this patent is extended or adjusted under 35 U.S.C. 154(b) by 0 days.

(21) Appl. No.: 16/223,836

(22) Filed: Dec. 18, 2018

(65) Prior Publication Data

US 2019/0379943 A1 Dec. 12, 2019

Related U.S. Application Data

(60) Provisional application No. 62/681,443, filed on Jun. 6, 2018.

(51) Int. Cl.
*H04N 21/472* (2011.01)
*H04N 21/845* (2011.01)
*H04N 21/488* (2011.01)
*G06F 40/166* (2020.01)

(52) U.S. Cl.
CPC ..... *H04N 21/47205* (2013.01); *G06F 40/166* (2020.01); *H04N 21/4884* (2013.01); *H04N 21/8456* (2013.01)

(58) Field of Classification Search
None
See application file for complete search history.

(56) References Cited

U.S. PATENT DOCUMENTS

| 10,356,481 | B2* | 7/2019 | Chou | |
| 2013/0033648 | A1* | 2/2013 | Oh | H04N 21/4316 348/731 |
| 2014/0198252 | A1 | 7/2014 | Pomprasitsakul et al. | |
| 2014/0201631 | A1* | 7/2014 | Pornprasitsakul | G06F 3/0484 715/716 |
| 2018/0143956 | A1* | 5/2018 | Skarbovsky | G06F 17/24 |

OTHER PUBLICATIONS

International Search Report and Written Opinion received for PCT Application Serial No. PCT/US2019/035618 dated Sep. 16, 2019, 15 pages.
Anonymous, "Usability—Character limits on fields—pros and cons and best practices?", Dec. 19,2016 , 4 pages.
Anonymous, "CaptionMaker/MacCaption 6.0 Quick Start Guide CaptionMaker and MacCaption Quick Start Guide Quick Start Guide Copyrights and Trademark Notices", Oct. 1, 2013, 66 pages.

\* cited by examiner

*Primary Examiner* — Omar S Parra
(74) *Attorney, Agent, or Firm* — Amin, Turocy & Watson, LLP

(57) ABSTRACT

The described technology is generally directed towards integrated tools for editing and otherwise working with close-captioning captions (or subtitles), including an on-screen editing interface that allows a user to select and edit caption text directly on-screen. Caption editing can include changing positioning metadata associated with a caption, changing timing metadata associated with a caption, and/or changing text content/text style metadata of a caption. A counter is provided to assist the user with respect to how many additional characters can be added to the caption. Also provided is a search interface that locates captions within a large set of captions, such as the full set of captions for a video.

20 Claims, 17 Drawing Sheets

EDITING TIMED-TEXT ELEMENTS

CROSS-REFERENCE TO RELATED APPLICATION

This application is a non-provisional of U.S. Provisional Patent Application No. 62/681,443, filed on Jun. 6, 2018, entitled "EDITING TIMED-TEXT ELEMENTS." The entirety of the aforementioned application is hereby incorporated by reference herein.

BACKGROUND

Closed captions (and subtitles) generally refer to displaying text elements (e.g., captions) in conjunction with a video. In the United States, the Federal Communication Commission has rules directed to closed captioning, including quality standards related to the timing, completeness, and placement of the text elements. Getting the text elements to appear in the appropriate way has been a complicated task.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is generally directed towards rendering an interactive interface for editing closed captioning captions, in which the interactive interface is rendered over displayed video content comprising a frame or partial frame of a video on which a caption being edited via the interactive interface is to appear during playback of the video. Described herein is receiving caption editing input data via the interactive interface with respect to the caption being edited, the editing input data corresponding to positioning metadata of the caption, timing metadata of the caption, or a text-related action corresponding to text content of the caption. Aspects comprise, in response to the receiving the caption editing input data, changing metadata or data associated with the caption.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
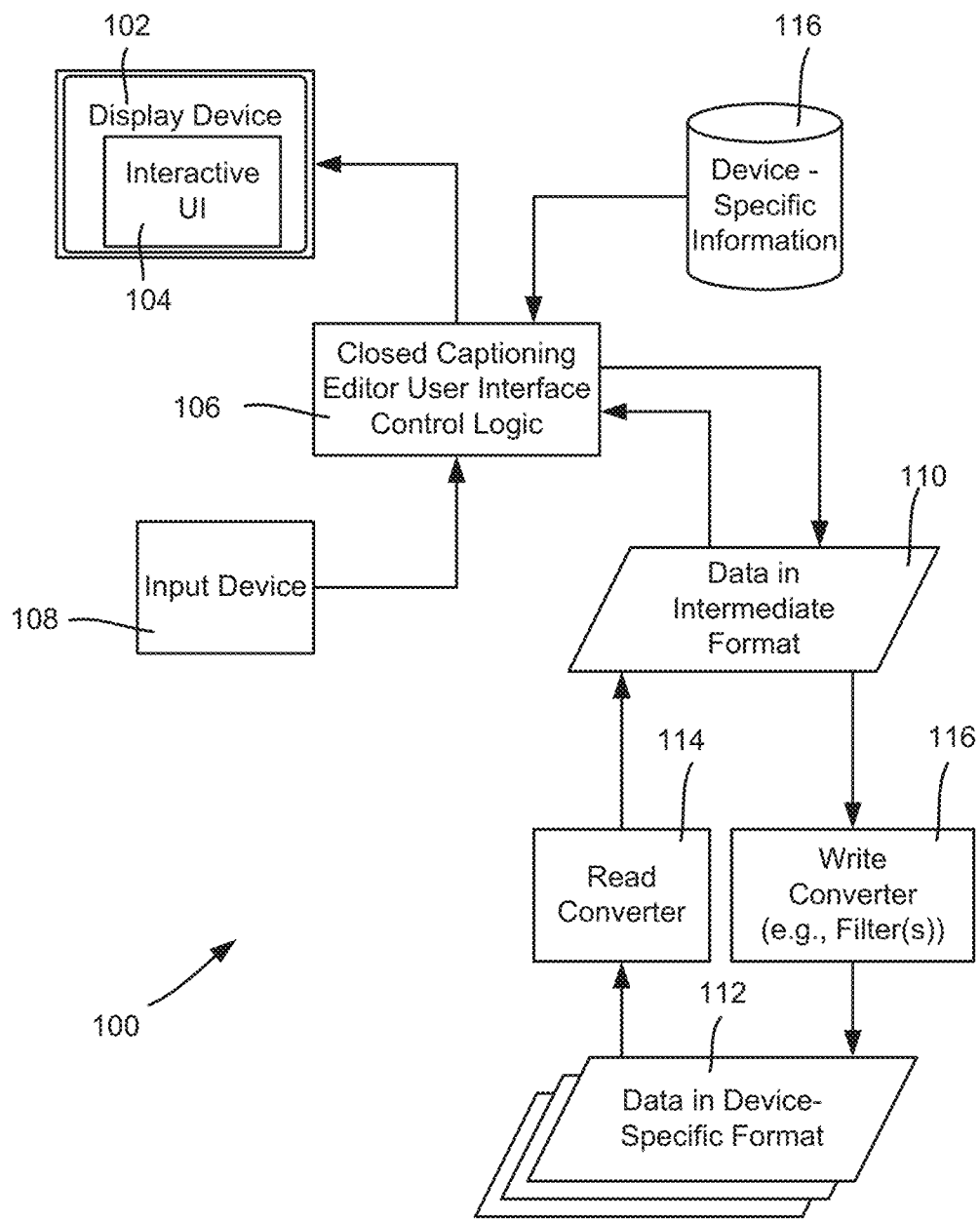
FIG. 1 is an example block diagram representation of example components that provide editing of closed captioning text contents, according to one or more example implementations.

Various aspects of the technology described herein are generally directed towards editing text elements that appear as captions, including creating, positioning, and/or timing text elements that appear as captions. As described herein, an interactive interface is provided that allows a user to edit and position the captions directly on-screen.

The technology described herein comprises various integrated tools for working with captions. One such tool comprises an on-screen editing interface that allows users to select and edit the text directly on-screen. Captions remain visible even when scrubbing (note that in other systems captions, can only be decoded correctly when the video plays every frame forward). As described herein, within the interactive interface, there is a control element that positions a text box that contains the caption. There is another control element that shifts the time at which the caption will appear, allowing the user to control when the caption will become visible. There is a counter that appears in the interface, which counts down the number of additional characters that can be typed (or pasted) into the text box.

The advantages of direct editing are significant. By way of example, what could take a large number of back-and-forth indirect user iterations to position a caption relative to a video frame can be done as described herein by a relatively small number of interactions (e.g., mouse clicks) that as described herein can directly position a video frame and caption. When considering the many captions in a relatively long video (e.g., a ninety minute movie), the editing time can be substantially reduced. Timing and/or text editing are also more efficient because the results of an editing operation can be dynamically displayed. Moreover, a remaining character counter assists the user in text editing, which can be particularly useful when dealing with a foreign language.

Another advantage of direct editing is viewing a caption as it will appear over the video. For example, consider a caption that is initially positioned based on certain text. However, because of editing of the caption, the caption's size (screen area) grows to where it now covers an important part of the frame, such as the speaking character's face. This is noticed directly by the user who is editing the captions, and who can then take action to reposition or otherwise modify the caption in some way that modifies its size. This can be particularly important when changing text to a foreign language, where the number of changed characters in a translated caption can differ significantly from that of the original text language.

Another tool comprises a search box (e.g., menu). This allows a user to search through a plurality of captions (e.g., all or a subset of the captions in a video) and find those that match selection criteria (e.g., a word or phrase or the like) entered by the user who is editing the captions. The search menu can allow for editing, global find and replace, and can be coupled to the editing interactive interface.

It should be understood that any of the examples herein are non-limiting. For instance, the text element examples and terminology generally refer to "captions" herein, which are intended to include conventional captions as well as "subtitles" (to the extent subtitles can be considered different from conventional captions). Further, the depicted interface and its interactive elements are only one non-limiting example; many alternative implementations of an interface that allows direct content editing of captions over the caption's corresponding video content (a video frame or partial video frame) can be configured based on the technology described herein. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and data editing in general.

In general, the closed captioning text data referred to herein that is to be edited can already exist in some form, such as provided in a data file or other data structure in conjunction with a prerecorded program, referred to herein as a "video" for purposes of brevity. Note that captions can be imported from external files, such as Scenarist Closed Caption (.scc) and .cap files; similarly, the closed-caption or subtitle data can be exported into a .scc or a text file, e.g., after editing.

As will be understood, aspects of the technology described herein are directed towards "fine-tuning"-based editing of such already-existing closed captioning text data (including text content and text metadata). Notwithstanding, the technology described herein can be used to initially generate closed captioning text data for a video, including from scratch, e.g., for storing in a file or other suitable data structure (e.g., a data stream that is part of a larger video file) in association with the video. In addition to initial creation, as another example closed captioning text captions can be provided in one language; the technology described herein allows a user to more easily create corresponding captions in another language and view and manipulate such corresponding captions directly on screen.

As is typical, any portion of the closed captioning text content, referred to herein as a "caption" that appears when activated during video playback, is associated with a range of video frames, generally represented by timing data. Caption ranges can overlap, at least to an extent, e.g., a caption can appear below another caption. A caption can replace another caption, or can, for example, "scroll up" all or part of an already appearing caption, possibly causing yet another caption or a part of that caption to disappear from (appear to scroll off) the screen.

FIG. 1 is a block diagram representing an example system 100 of components that can be used to implement various aspects of the technology described herein. A display device 102 renders a representation of an interactive closed captioning editor user interface (UI) 104. As described herein, in one or more implementations, the interactive closed captioning editor user interface 104 is controlled by closed captioning editor user interface control logic 106, based on user input via an input device 108. At least part of the input device 108 can be integrated with the display device 102, e.g., as touch-screen input.

In one or more implementations described herein, the closed captioning text data (text content and metadata) that is edited via the closed captioning editor user interface control logic 106 is in an intermediate format 110. One typical intermediate format for the data comprises, for each caption to display, the Unicode text representation of that caption, data for line breaks, positioning metadata (the starting x- and y-screen coordinates where the caption appears), style metadata (e.g., caption appearance such as text size, italicization or not, and the like), and time code data corresponding to the time/video frames during which the caption is to appear (when closed captioning is activated) in conjunction with the played back video.

As is understood, there are different types of televisions, computer monitors, smart phone screens and so on that can play back video. The data can thus be maintained in different device-specific formats 112 corresponding to the types of playback devices, such as in a standard definition (SD) television format (stored in a vertical blanking interval), high definition (HD) television format (stored in a separate stream), a web-based format suitable for browsers, cellphone applications, and so on, including formats that may be developed in the future. As shown in FIG. 1, a read converter 114 can process data from a device-specific format into the intermediate format (e.g., so that an existing file from a standard definition movie can be edited into a newer format, such as a web-based video format that can, for example be edited to include new features such as styles or other effects not available in the older format). Similarly, a write converter 116 can perform operations such as to filter out and or convert data from the intermediate format to a device-specific format (e.g., to remove styles/effects before saving to a device-specific data format that does not understand such information).

In one alternative, the close captioning editor user interface control logic 106 can vary the user interface 104 so as to prevent a user from making changes to closed captioning text data that are incompatible with a specific device for which the closed captioning text data is being edited. For example, if the user/editor indicates that the editing operations ae being performed with respect to displaying on a standard definition television, then, for example the available screen coordinates, certain style data and so on may be controlled to limit what the user can do based on standard definition limits. Various device-specific-information 116 (e.g., rules, parameter limits and the like) may be accessed by the close captioning editor user interface control logic 106 for this purpose.

Figure 2:
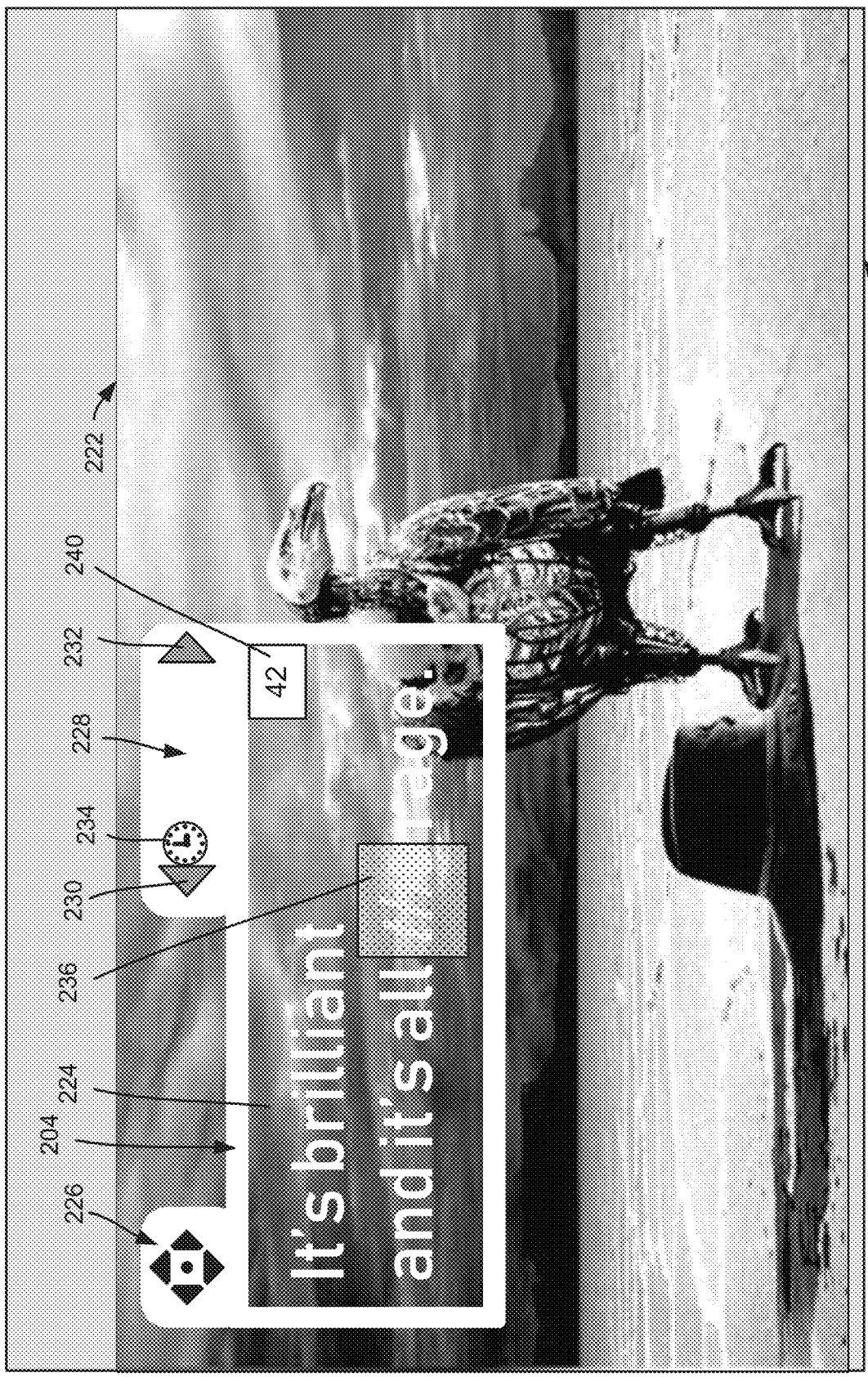
FIG. 2 is a representation of an example interactive interface by which captions can be edited with respect to relative positioning, relative timing and text content of a selected caption, according to one or more example implementations.

FIG. 2 shows an example of how one example instance 204 of the closed captioning editor user interface 104 (FIG. 1) can be displayed in a program window 220 (e.g., on the display device 102 of FIG. 1) in conjunction with a displayed frame 222 of the video, e.g. by overlaying the user interface on the displayed video frame 222. In the example, an interactive text box 224 presents the caption and thereby allows the text of the caption to be edited as described herein. Note that FIG. 2 is not intended to represent any elements to scale; for example the closed captioning editor user interface 104 is shown for purposes of ease of viewing the exemplified elements rather than to convey a relative size with respect to any displayed video frame, partial video frame and/or display screen program window 220.

An interactive (displayed) cursor pad 226 or the like is provided for positioning the text within the video frame, and in this example includes at least a left cursor control element, a right cursor control element, an up cursor control element, and a down cursor control element. As will be understood, interaction with a cursor element changes the associated x- and y-coordinates in the text metadata for this caption (within limits) and correspondingly dynamically moves the user interface around the screen (by redrawing). Note that the limits may be such that at least part of the closed captioning editor user interface instance 204 appears outside the displayed video frame or partial video frame so that the caption positioning is not limited by the size of the editor user interface; scrolling of the displayed video frame or partial video frame behind the closed captioning editor user interface instance 204 is also feasible, e.g., if part of the interface instance 204 reaches the edge of the program window 220 but the caption's text position has not yet reached its limits relative to the displayed video frame 222.

In the example of FIG. 2, another part of the example closed captioning editor user interface instance 204 comprises a tab 228 or the like having interactive elements directed towards controlling/editing the timing of the appearance of the caption, that is, the range of the times (corresponding to a series of frames) during which the caption will appear in conjunction with the video playback. Note that for simplification purposes, and because the frame rate can vary between devices, time information rather than frame information is generally used when editing captions.

The timing of the appearance of the caption can be controlled by the left timing arrow element 230, which if actuated, displays (takes the user to) the first frame where the caption appears. The right timing arrow 232 displays (takes the user to) the last frame where the caption appears. Dragging the element 234 (represented by a clock icon in the example of FIG. 2) to a location between the two arrows 230 and 232 displays (takes the user to) a corresponding frame in between the arrows, e.g., proportional to the relative position of the element 234 between the arrow elements 230 and 232 when the dragged element 234 released to stop the dragging operation. Dragging the element 234 (clock icon) beyond the position of one of the arrows drags the caption to a new time range of corresponding video frames, that is backward in time (if dragged left beyond left arrow 230) or forward in time (if dragged right beyond right arrow 232), respectively.

With respect to editing the caption content in the text block 224, as exemplified herein, typical text editing operations may be performed, including typing text characters, pasting text characters, handling backspace/delete operations, selecting text, rearranging (e.g., dragging selected) text and so on. Text selection, exemplified by text highlight block 236, represents the ability for a user/editor to interact to select some or all of the caption's text.

As another text-editing feature, in one or more implementations a remaining character counter 240 (e.g., appearing in the upper right corner of the text block 224) counts down the number of additional characters that can be typed into the box based on a defined character count limit. Color can be used to warn the user when the remaining count is getting low or is used up. For example, in one or more implementations the background box (the rectangle behind the numeric counter 240) is colored green as long as ten characters or more can be entered, turns yellow when only five characters or more can be entered, and turns red when no more characters can be entered. This can be highly useful when working with captions for languages with low information density, which often need more syllables to express the same content.

Although not explicitly shown in FIG. 2, it is understood that other interactive user interface elements may be present, such as an interactive element to return to a main menu, an interactive element to switch to or open a search user interface (e.g., the example search window 330 of FIG. 3), an interactive element to request help, an interactive element to save and resume, and so on. Other typical interactive elements can comprise typical application program buttons such as maximize, minimize and close program buttons.

Figure 3:
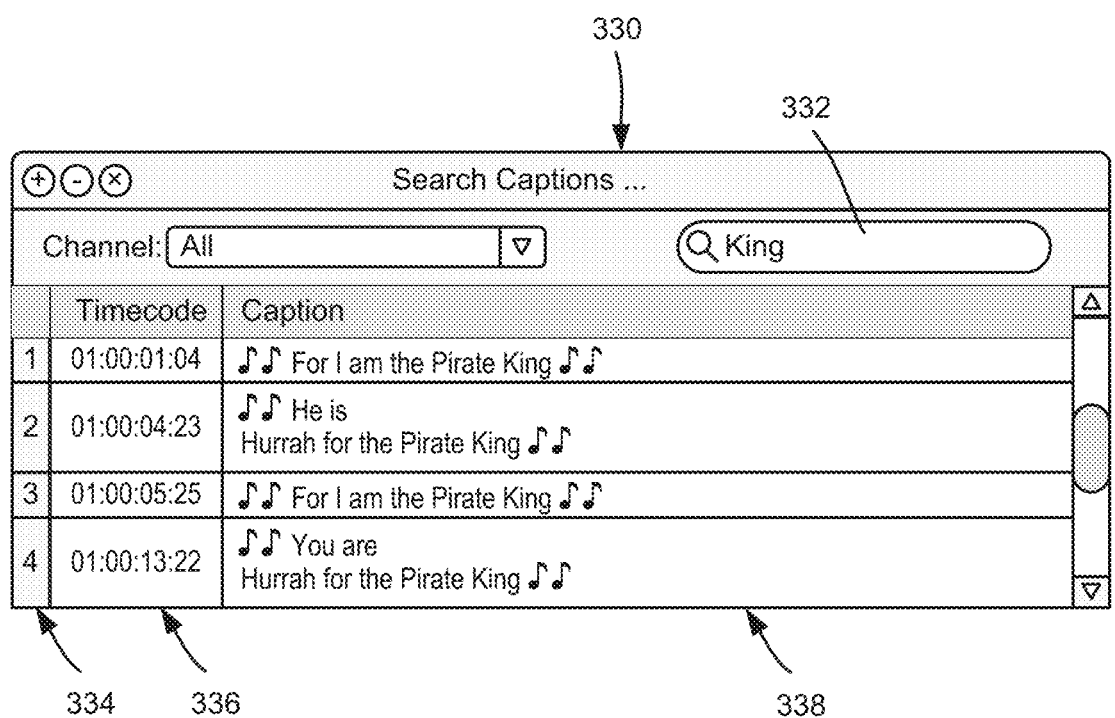
FIG. 3 is a representation of an example interactive interface by which captions can be searched and presented in association with timecode data, according to one or more example implementations.

FIG. 3 shows a search ("Search Captions . . . ") window/user interface 330. A user enters (e.g., pastes or types) a search term or terms in a search text entry box 332, which allows the user to search a file or the like for a particular word or expression in one or all of the caption channels available, where, for example, different channels can correspond to the captions in different languages. Note that in one or more implementations, captions also can be edited in the search window 330. In one or more implementations, the search window 330 also allows for global search and replace operations.

The search results can be rendered as a list of items or the like, e.g., with a time-ordered sequence number in a column 334, timecode data (e.g., starting time) in a timecode column 336 and the caption in a caption column 338. Other data can appear in other columns, columns such as an ending time column and/or an appearance duration column.

Although not explicitly shown in FIG. 3, it is understood that other interactive user interface elements may be present on or adjacent the search interface, such as an interactive element to return to a main menu, an interactive element to switch to or open the editor interface (e.g., the example editing window 220 of FIG. 2), an interactive element to request help, and so on.

FIGS. 4-12 comprise a flow diagram representing example operations that can be performed by a program or the like corresponding to the closed captioning editor user interface control logic 106 of FIG. 1. It is understood that these operations are only some possible, non-limiting examples, and that in a given interface configuration, different operations may be present, less than those operations exemplified in FIGS. 4-12 may be present, and/or additional operations may be present. Further note that the exemplified ordering of many of the operations can be different.

Figure 4:
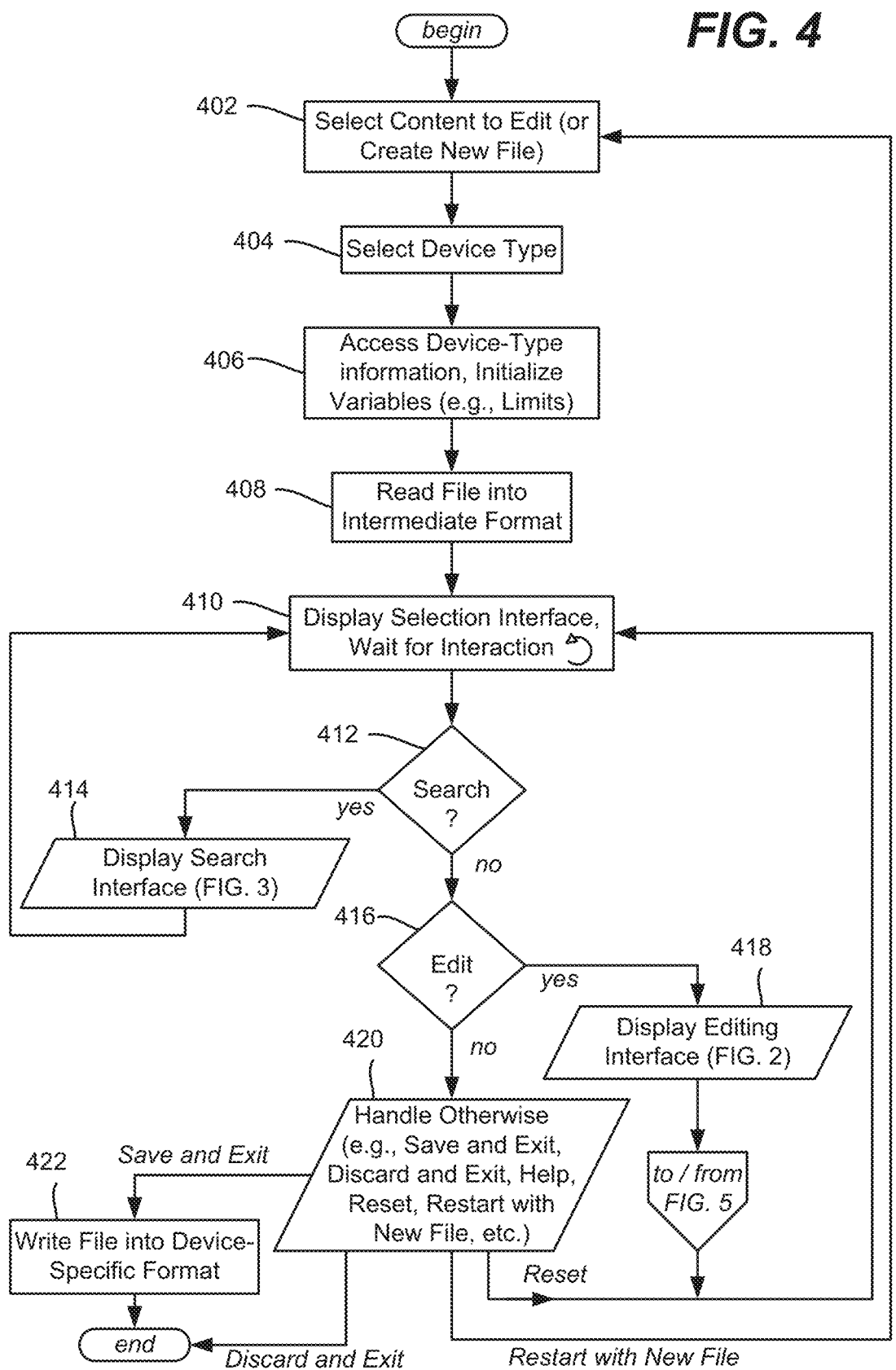
FIGS. 4-12 comprise a flow diagram showing example logic/operations that can be taken to edit a caption, including with respect to relative positioning, relative timing and/or text content, according to one or more example implementations.

FIG. 4 represents example operations related to an example main program window/main menu or the like, beginning at operation 402, which represents interaction by the user directed towards selecting the closed captioning content to edit, e.g., in an existing closed captioning file. As described above, it is also feasible for a user to create a new file at operation 402.

Operation 404 represents interaction by the user directed towards indicating the type of device on which the closed captioning captions are to be rendered, (although it is feasible that such information may be known from the file selected at operation 402). Operation 406 represents the logic accessing device type-specific information, e.g., from the data store 116 (of FIG. 1), such as to initialize variables such as limits that can depend on the device type. Operation 408 represents reading the file into the intermediate format, if not already in such a format.

Operation 410 represents displaying an interactive user interface by which the user can select the closed captioning search interface (e.g., FIG. 3) or the closed captioning editing interface (e.g., FIG. 2). In this example, the logic represented in FIG. 4 waits for user interaction.

Once interaction input is received, operation 412 represents evaluating whether the input is requesting the search interface; if so, operation 414 presents the search interface (e.g., FIG. 3) to the user. Note that after the user exits the search interface, operation 414 is shown as returning to operation 410 to await further input; a feasible alternative is to allow the user to select the editing interface directly from the search interface, e.g., without returning to a main selection interface. For example, if a user searches for a caption and finds a desired caption, the user can click on the caption (e.g., one of the displayed fields for that caption) and the logic can jump to the editing interface directly to that caption's location in the intermediate file so as to display that caption and corresponding video frame to the user.

Returning to operation 412, if the input is not requesting the search interface, operation 416 represents evaluating whether the input is requesting the editing interface. If so, operation 418 presents the editing interface (e.g., FIG. 2) to the user, and the process continues to operation 502 of FIG. 5 as described herein.

If neither search nor editing is requested, operation 420 generally represents handling the input otherwise. Example, non-limiting other actions that may be performed can be to exit the program (e.g., with save any editing changes and exit, or discard any editing changes and exit options), request help, reset (e.g., discard any editing changes and start over), restart with a new file, and so on. If saving changes and exiting, operation 422 writes the file, e.g., into a device-specific format file.

Figure 5:
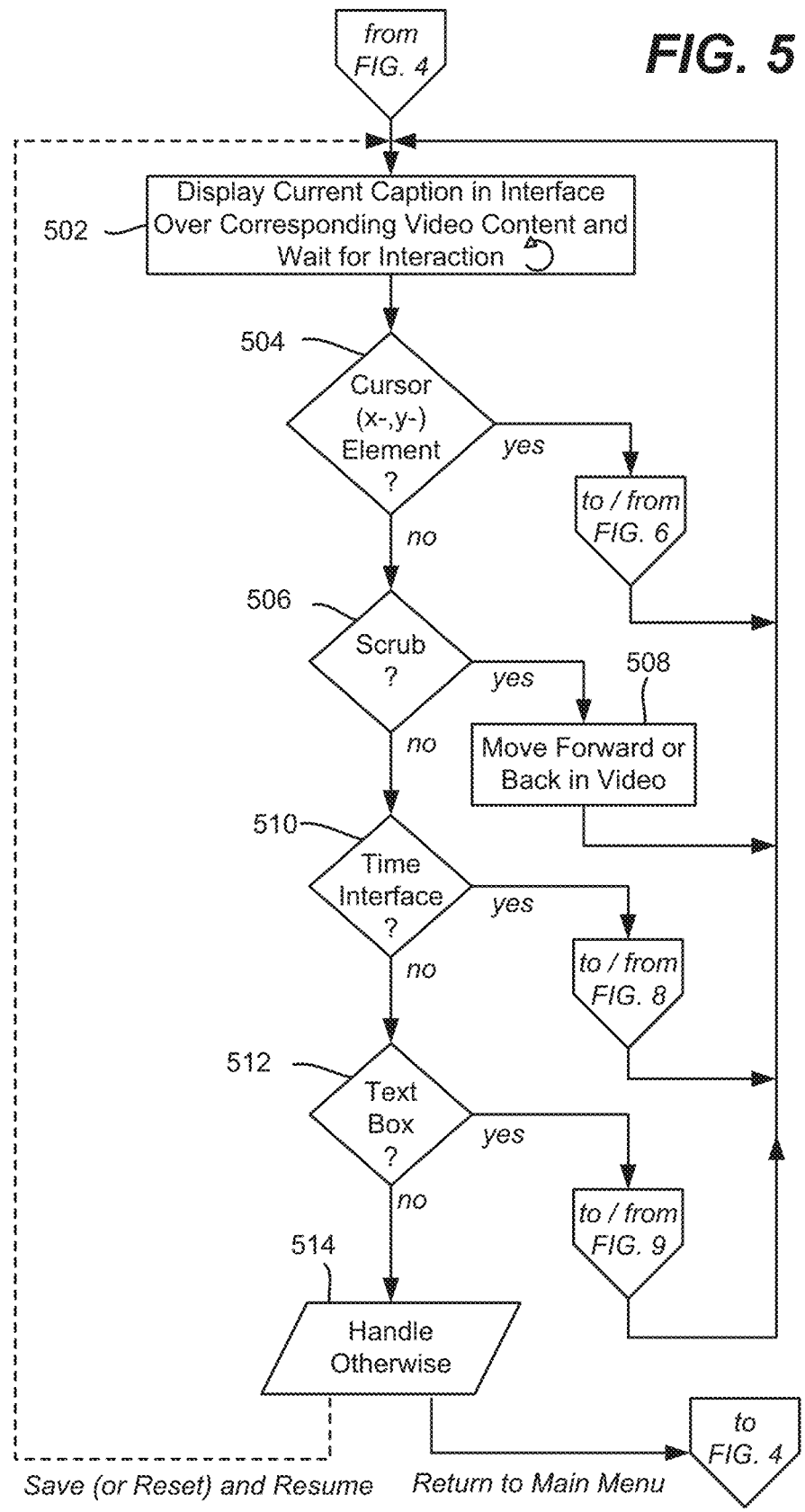

Returning to operations 416 and 418, in this example selecting the editing user interface displays the editing interface (operation 418) and takes the user to operation 502 of FIG. 5 to display a current caption in the editing interface over the caption's corresponding video content (a frame or partial frame) and wait for further interaction. For example, the editing starts with the first caption as the current caption and its corresponding first video frame, unless the user has performed some action (e.g., jumped to a caption via the search menu) to start at another caption/location within the video as the current caption and corresponding video frame.

Figure 6:
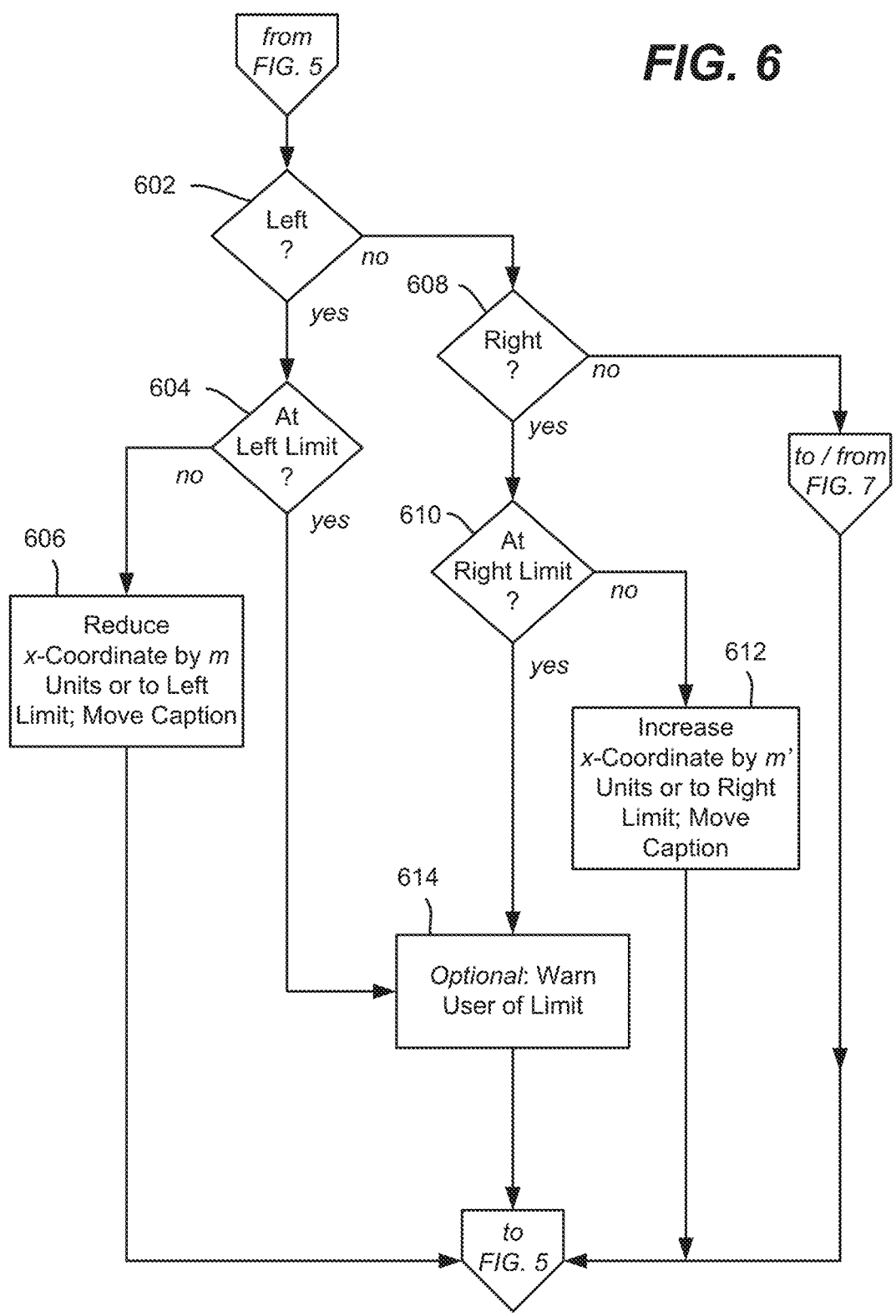

Upon interaction corresponding to user input, example operations of FIG. 5 include detecting (operation 504) that the interaction was with the cursor element (e.g., one of the arrows of the element 226 of FIG. 2), which causes the process to go to the example operations of FIG. 6. Another operation is for detecting scrubbing interaction (operation 506), which is a well-known video editing concept that changes the current frame in a video to a new frame (video location) as represented by operation 508.

Figure 8:
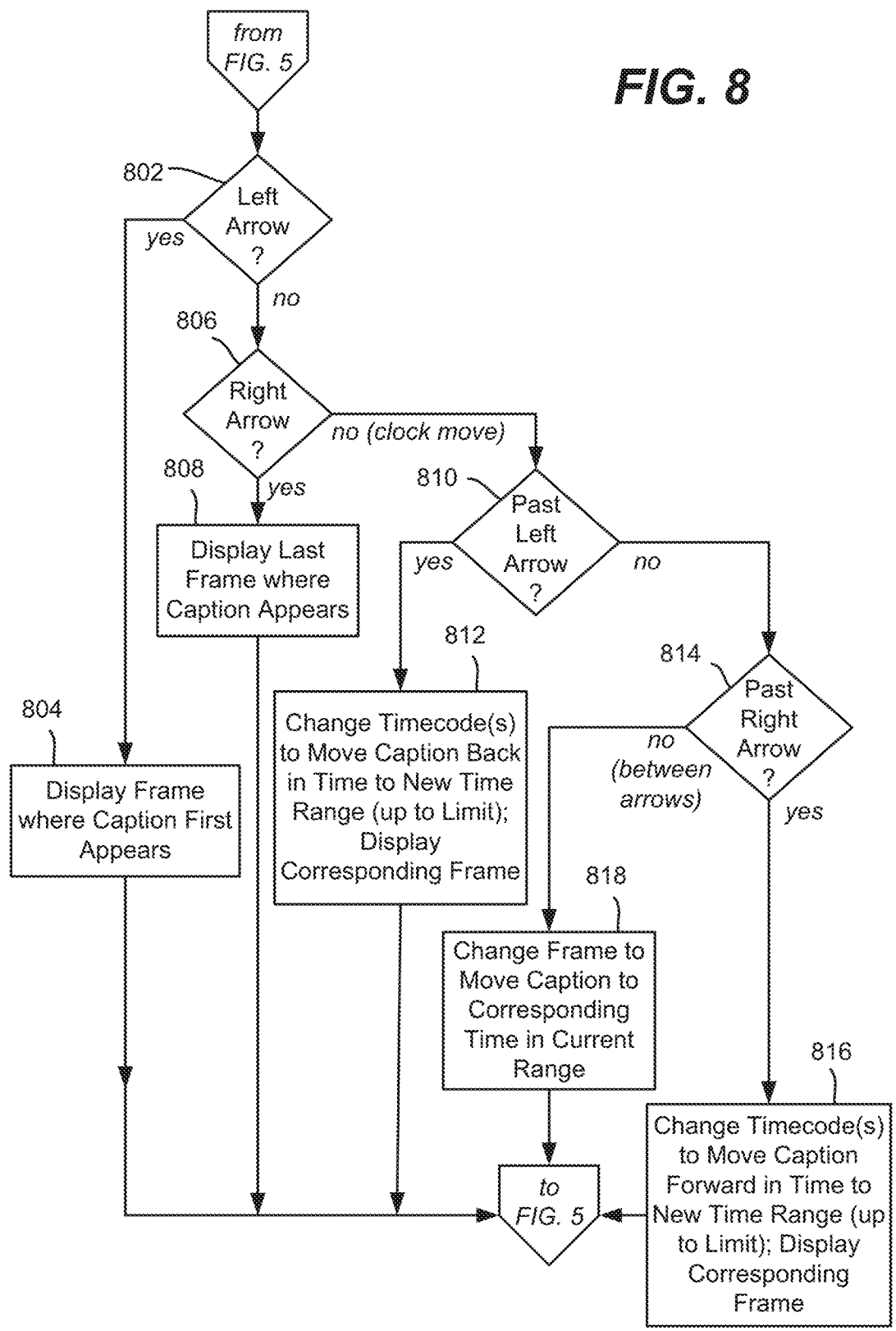

Another example operation in FIG. 5 is directed towards detecting (operation 510) that the interaction was with the time interface (e.g., one of the elements of the time tab 228 of FIG. 2), which causes the process to go to the example operations of FIG. 8. Yet another example operation in FIG. 5 is directed towards detecting (operation 512) that the interaction was with the text box (e.g., 224 of FIG. 2), which causes the process to go to the example operations of FIG. 9.

Operation 514 represents handling any other input, e.g., save (or reset) and resume, which can save or discard the data changes, returning to the main menu interface, and so on. Other possible example input (not shown in FIG. 5) can be directed towards actions such as a request for a help menu, a request for directly invoking the search interface, a discard and resume operation, and so on.

FIG. 6 exemplifies actions that can be taken when the user interacts with the cursor pad. Operation 602 represents evaluating whether the left arrow was selected; if so, operation 604 evaluates whether the x-coordinate is already at the left limit (including after any scrolling of the background), and if not, operation 606 decreases the x-coordinate in the metadata (down to the left limit) and thereby dynamically moves the caption (which in turn can also move the interface and the text box containing the caption). Note that the amount of movement can be determined by a variable, e.g., m units (e.g., pixels) in the example of operation 706. The variable m can depend on the device type, e.g., a larger n for devices with more pixels. The variable m also can change within the editing session, e.g., based on the interaction rate, the user can "accelerate" the movement. Note further that if already at the left limit, operation 604 can branch to operation 614 to warn the user of the limit having been reached, e.g., by outputting an audible beep, prompting and/or the like.

Operations 608, 610 and 612 are for the right interactive arrow, and are similar to those for the left arrow except that a right limit is evaluated at operation 610, and the x-coordinate increased at operation 612, up to the right limit. It also should be noted that instead of decreasing the x-coordinate by m units, the right arrow increases the x-coordinate by m' units; m and m' can be equal, however having different values allows for coarse tuning and fine-tuning, e.g., moving right can be for coarser tuning and moving left can be for finer tuning, (e.g., if m' is greater than m).

Figure 7:
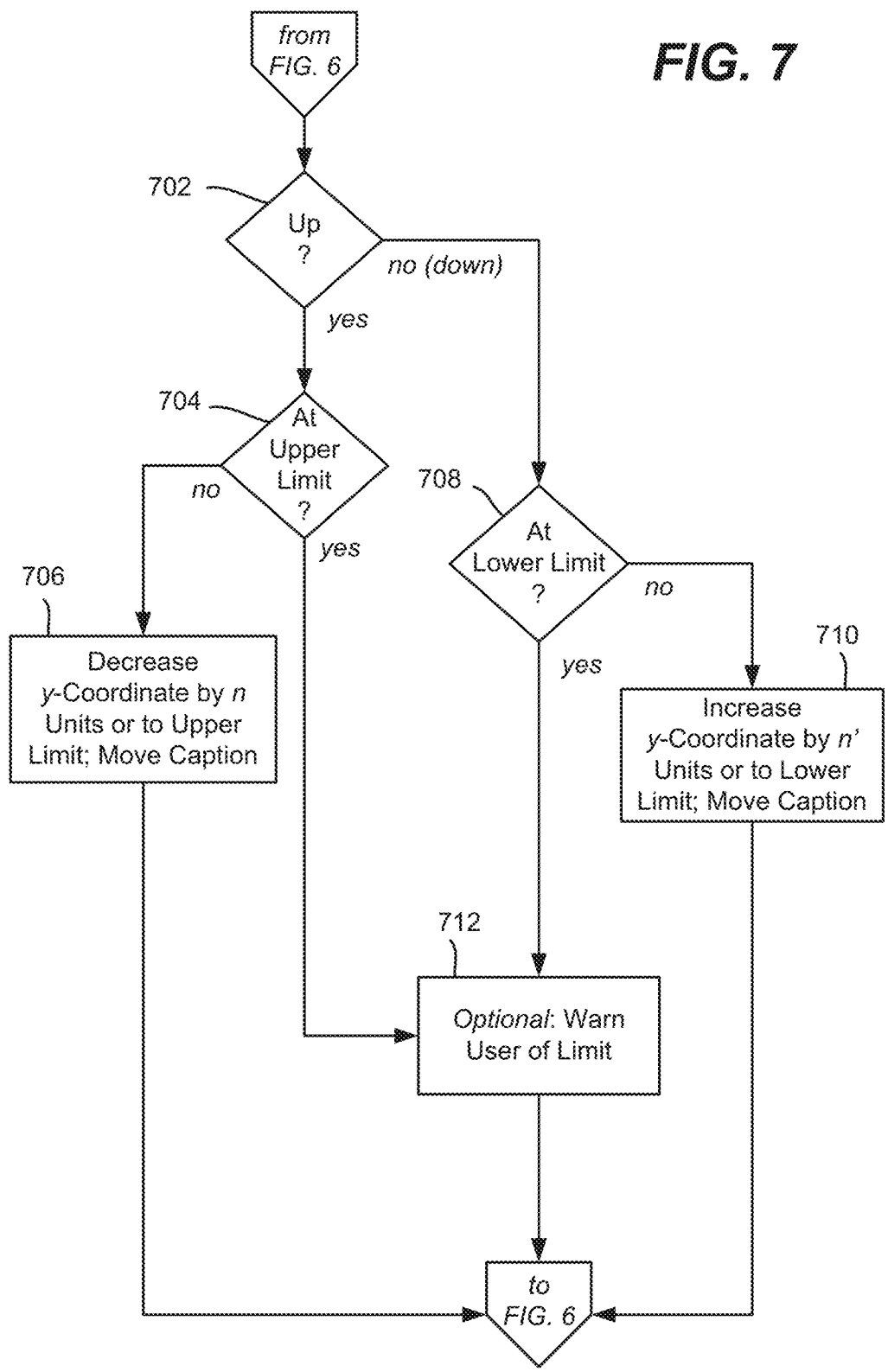

FIG. 7 is generally the same as FIG. 6 except that the up and down interactive elements are exemplified instead of the left and right elements, and thus are directed towards changing the y-coordinate within vertical limits. Note that because the screen coordinates are such that (0, 0) is the top left of the screen, moving "up" corresponds to decreasing the y-coordinate. The movement units n and n' can be dependent on the device type, and can be the same as each other, the same as m and m', or can be independent of any other variable.

In this way, a user can fine-tune position the caption as desired relative to the displayed video content behind the interface. Although not explicitly shown in FIGS. 6 and 7, it is also feasible for the user to interact and "hold" a cursor pad element, which upon release moves the interface an amount that depends on how much time elapsed between the initial interaction and the release. It is also feasible for a user to drag the entire interface including the text box and any caption therein to a desired location relative to the displayed video frame or partial video frame, and if desired, fine-tune the position from there using the interactive cursor element arrow(s).

Returning to FIG. 5, consider that the user interacts with the time interface 228 (FIG. 2). If so, the process branches to the example operations of FIG. 8.

In FIG. 8, operation 802 evaluates whether the interaction was with the left timing arrow 230 (FIG. 2). If so, operation 804 displays the video content corresponding to the frame where the caption first appears.

If not the left timing arrow, operation 806 evaluates whether the interaction was with the right timing arrow 232 (FIG. 2). If so, operation 808 displays the video content corresponding to the frame where the caption last appears.

If neither the left timing arrow nor the right timing arrow, the operation was a clock icon 234 drag. If the clock was dragged past the left arrow (operation 810), then operation 812 changes the timecode to move the caption back in time to new time range (up to a limit), and displays the video content of the corresponding frame behind the editing interface. Note that this may impact another, previous caption, and thus the editing interface may indicate this to the user, e.g., at least two captions are overlapping in space and time. It is also feasible for a limit to be determined based on the previous caption, or for some automated correction to be performed, e.g., scroll the previous caption so that they do not overlap in space, only in time.

Operations 814 and 816 represent actions performed when the clock icon is dragged past the right timing arrow. The same general rules with respect to the left arrow can be applied, except to note that an overlap in time situation may scroll the current caption instead of the next caption.

If the clock icon 234 is dragged between the timing arrows, then operation 818 is performed. This changes the background video content based on a frame between the start and end of the caption times. In general, the frame is selected based on the relative proportional location of the clock icon 234 when released, relative to the left and right timing arrow.

Returning again to FIG. 5, consider that the user interacts in some way with the text box 224 (FIG. 2); (non-limiting example operations can include selecting text, moving a cursor, undoing/redoing previous text editing, dragging text, typing a character, pasting character(s), backspace/delete, moving a text cursor location and the like). If so, the process branches to the example operations of FIG. 9.

Operations 902 and 904 represent handling an undo or redo request, which basically can restore or repeat a saved editing action forward or backward in time. A sequence identifier or the like can be associated with a saved instruction, with undo moving to the prior action, redo moving to a next action that is saved or repeating if no next action exists.

Another possible action corresponds to selecting one or more characters of text, as represented by operations 906 and 908 (select and highlight the selected text). Text selection generally can be done in a manner that is already familiar to users from other applications; e.g., if using a mouse, a click-and-drag over text, double-click (select word) or triple-click (select caption) are well-known possible text selection operations. Note that although not separately shown, once text is selected, the selected text can be copied to a clipboard.

Figure 13:
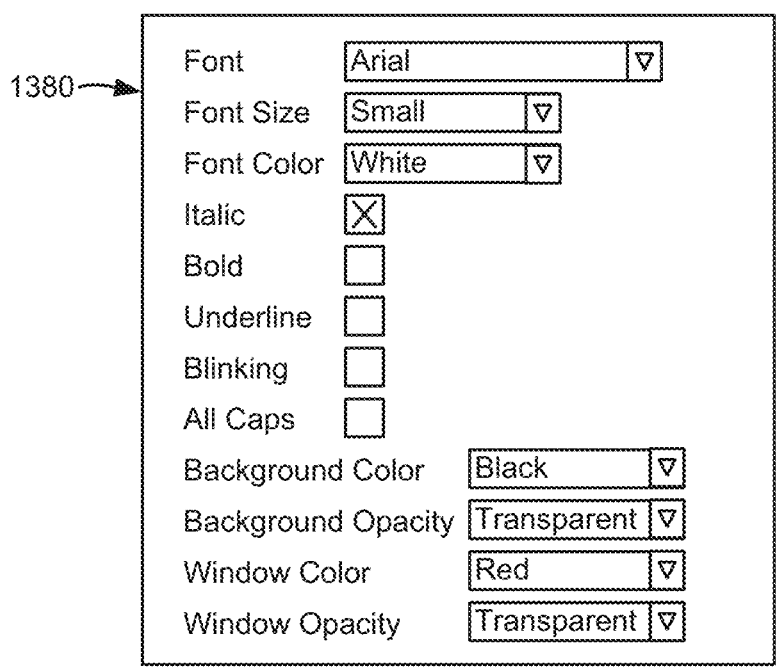
FIG. 13 is a representation of an example interactive interface by which one or more styles for captions can be viewed and modified, according to one or more example implementations.

In one or more implementations, whenever text is selected, or upon some other indication such as an entered command, a caption style menu 1380 or the like (FIG. 13) can be automatically rendered in conjunction with the interface 204. As exemplified in FIG. 13, the user can vary the style metadata of the selected text, corresponding to the appearance within the caption, such as various font-related metadata, and (if available) background metadata and window (the larger area in which the caption and background can appear) metadata. Note that some of these non-limiting example metadata variables may be unavailable with some devices, and thus these can be grayed out or not shown on a given menu. Further note that a user can edit captions for one display device, and have certain metadata filtered out/coordinate-adjusted for a display device with less capabilities when saving to a device-specific file or the like.

Another operation, represented by example operations 910 and 912, is to drag already-selected text to rearrange the text ordering within a caption. Operation 914 represents saving any editing action for future possible undo/redo/repeat operations.

Figure 10:
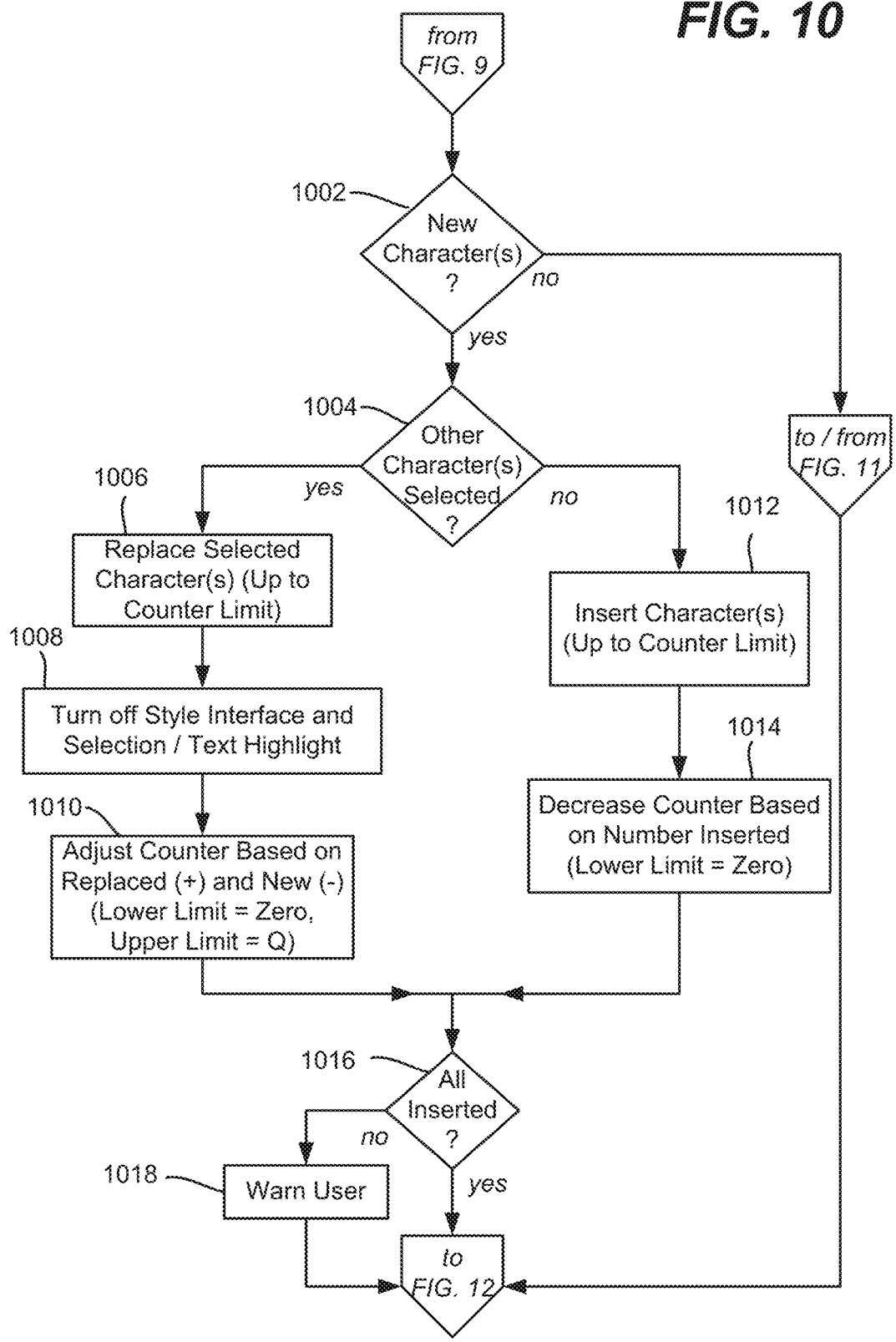

Returning to the "no" branch of operation 910 which branches to FIG. 10, operation 1002 of FIG. 10 represents evaluating whether one or more new characters were entered, for example a single character entered by typing or a paste operation of one or more characters. If so, operation 1004 evaluates whether the new character(s) are to overwrite selected text, or are to be inserted at the current text cursor position.

If text is currently selected, then operation 1006 handles the overwrite/replace operation, subject to a total character count limit (corresponding to the remaining character counter 240 of FIG. 2, and which can be device-dependent). For a typed character, the limit cannot be reached at operation 1006 because one new character is replacing at least one existing, selected character. However, with a paste operation it is possible to paste more new characters than currently selected, which can cause the limit to be exceeded, which is not allowed. One way to handle too many characters is to only paste up to the remaining character limit; e.g., if attempting to paste ten characters over five, but the remaining characters limit is three, then only paste three of the five. Other alternatives, not shown, include not allowing the paste operation, or pasting the characters into a separate pop-up box or the like (so that the copied text can be viewed/separately edited) and inform the user of the character count limit issue, so that the user can resolve the issue.

Figure 9:
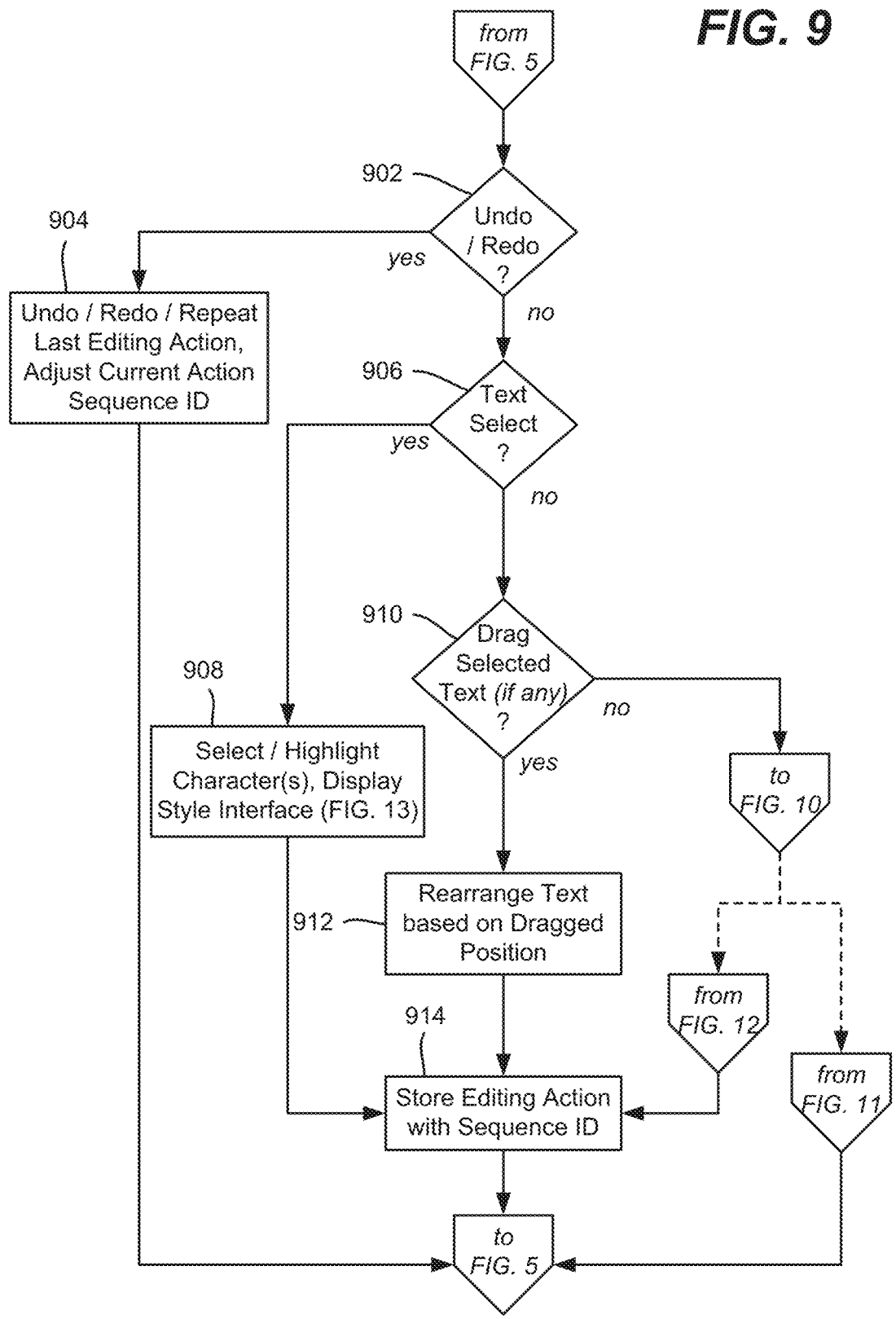

Operation 1006 represents turning off the style interface and the highlight selection box, because the new text is not selected unless and until the user selects the new text (e.g., via operations 906 and 908 of FIG. 9). Operation 1010 represents adjusting the remaining character counter (displayed in the box 240 of FIG. 2). Note that the upper countdown limit can be set via a variable, Q in this example.

Returning to operation 1004, if the user is not overwriting selected text, operation 1012 inserts the new text via a typing or paste operation. Note that if already at the remaining character limit of zero, operation 1012 may not insert text and instead warn the user (e.g., beep) if already at the limit, that is, no characters can be entered until one or more are deleted from the current caption. As with overwriting text at step 1006, a paste operation at operation 1012 can be partial, denied or to a separate pop-up box or the like if the full text pasting operation otherwise would exceed the limit.

Operation 1014 decreases the remaining character counter, down to zero based on the number of character(s) inserted. This count can be maintained in memory and updated as characters are added and deleted, with the remaining character count also represented in FIG. 2 by the counted down value in the box 240.

In an embodiment in which a partial paste, up to the total limit, is how a paste operation is prevented from exceeding the limit, operation 1016 represents evaluating whether all paste-requested characters were inserted at operation 1006 or operation 1012. If not, operation 1018 warns the user in some way, e.g., via a prompt or the like. The process continues to FIG. 12, which in general sets the color of the background of the remaining character counter based on the remaining count.

Figure 11:
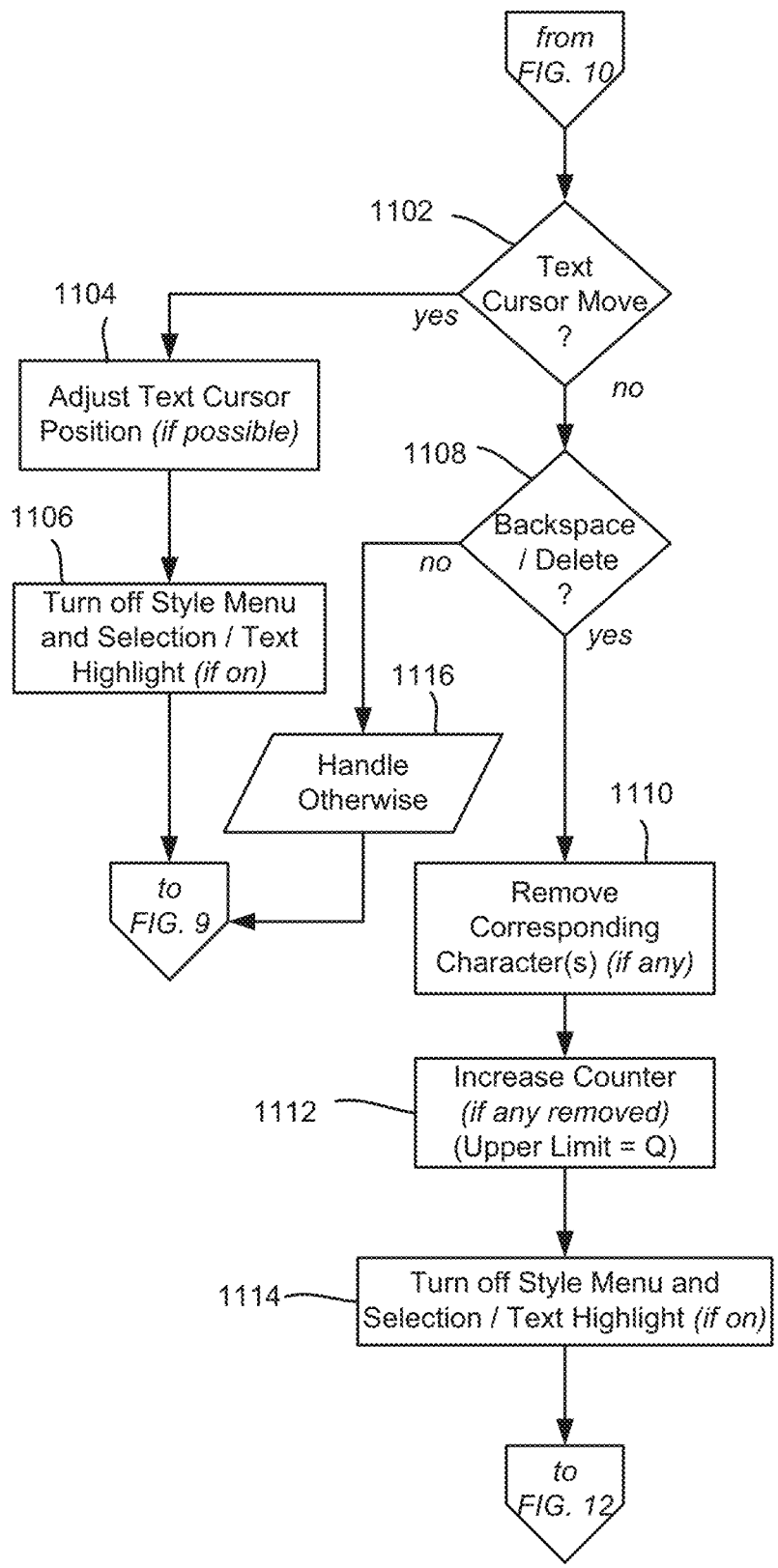

Returning to operation 1002, the "no" branch branches to operation 1102 of FIG. 11, which evaluates whether the user interaction moved the text cursor, e.g., via a cursor arrow, home button, end button and so on. If so, operation 1104 adjusts the text cursor position (although it may not be moved, such if there are no characters, or the user is already at the end or beginning and tries to move further past that direction. In this example a cursor move also turns off the style menu (if on) at operation 1106, along with any text selection/highlighting.

Operation 1108 evaluates whether the user interaction was a backspace or delete action, and if so, operation 1110 removes the corresponding character (or characters if text had been selected) assuming at least one character is in position for a backspace/delete action. Operation 1112 increases the counter based on any text removed. Note that a cut operation of selected text (not separately shown) is the same as a backspace or delete action when text was selected, while also adding the text to the clipboard. In this example a backspace/delete/cut action also turns off the style menu (if on) at operation 1114, along with any text selection/highlighting.

Figure 12:
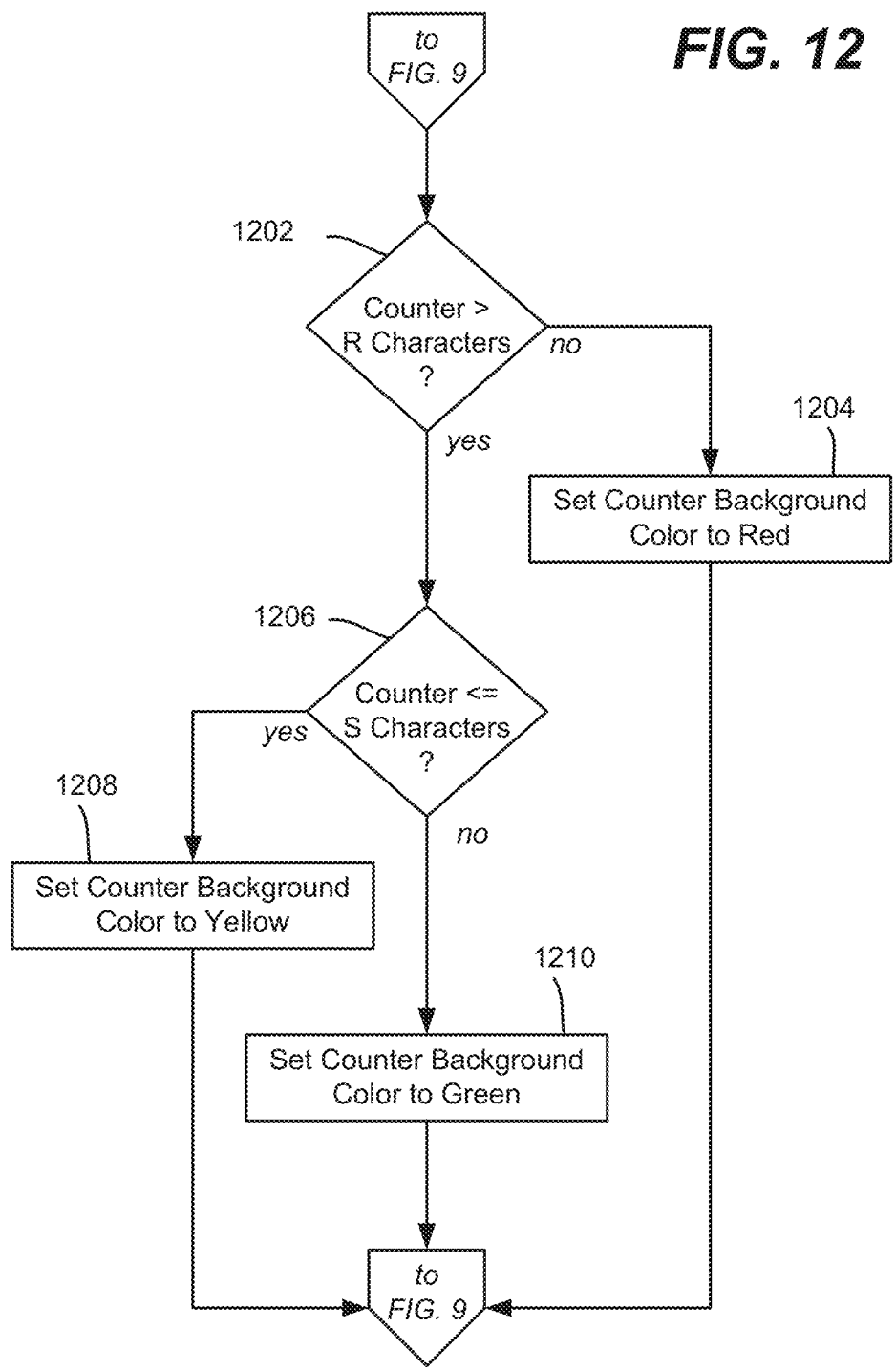

FIG. 12 represents logic for changing the remaining character counter background color. If the counter is not above some lower number of characters, e.g., R, the background color is set to one color at operation 1204, such as red. Note that R can be one, meaning the counter is only red when the remaining character counter is at zero no more characters can be entered.

If not at the low character level, operation 1206 evaluates whether the counter is less than another threshold value S, such as five characters. If so, operation 1208 sets the counter background color to another value, e.g., yellow. Otherwise operation 1210 sets the background color to green.

It is feasible to have a color gradient or some other gradual transition in color from one threshold to another. For example, the color can be solid green above ten characters, and then gradually transition towards solid yellow (at five characters), and transition from yellow to red as the count goes towards zero remaining characters (solid red). Other effects such as the counter value's font color or font size changes, flashing, animation and so forth can be used to alert the user to a low-character remaining situation, for example.

Figure 14:
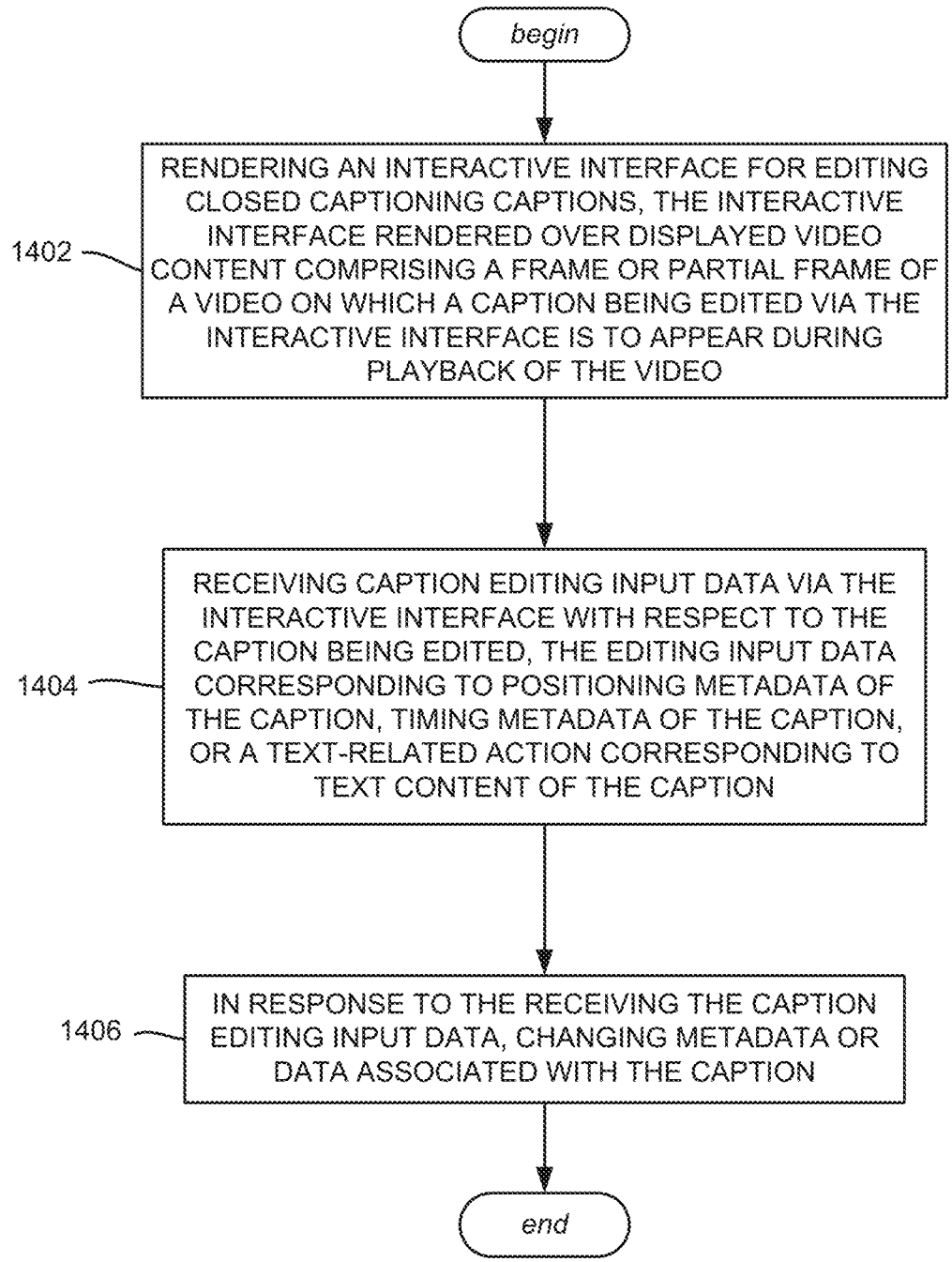
FIG. 14 comprises a flow diagram showing example logic/operations corresponding to caption editing operations, according to one or more example implementations.

One or more aspects, summarized in FIG. 14, are directed towards rendering (operation 1402) an interactive interface for editing closed captioning captions, the interactive interface rendered over displayed video content comprising a frame or partial frame of a video on which a caption being edited via the interactive interface is to appear during playback of the video. Aspects include receiving (operation 1404) caption editing input data via the interactive interface with respect to the caption being edited, the editing input data corresponding to positioning metadata of the caption, timing metadata of the caption, or a text-related action corresponding to text content of the caption. In response to the receiving the caption editing input data, aspects comprise changing (operation 1406) metadata or data associated with the caption.

Receiving the caption editing input data via the interactive interface can comprise receiving positioning interaction input data corresponding to the positioning metadata of the caption. Other aspects can comprise dynamically moving the interactive interface relative to the displayed video content in response to the receiving the positioning interaction input data to render the caption at a relative actual location at which the caption is to appear during playback of the video.

Receiving the caption editing input data via the interactive interface can comprise receiving timing interaction input data corresponding to the timing metadata of the caption. Other aspects can comprise dynamically changing the displayed video content in response to the receiving the timing interaction input data.

Receiving the caption editing input data via the interactive interface can comprise receiving text-related input data corresponding to the text content of the caption. Other aspects can comprise dynamically changing the displayed text content in response to the receiving the text-related input data. Receiving the caption editing input data can comprise receiving text content style metadata corresponding to a selected portion of the text content. Receiving the caption editing input data can comprise receiving a change to the text content. Other aspects can comprise maintaining a counter corresponding to how many more characters of text content are able to be entered relative to a limit, and rendering a representation of the counter in conjunction with the interactive interface.

Other aspects can comprise rendering an interactive search menu, the interactive search menu comprising a search input element for entering text to search within a group of closed captions associated with the video.

Figure 15:
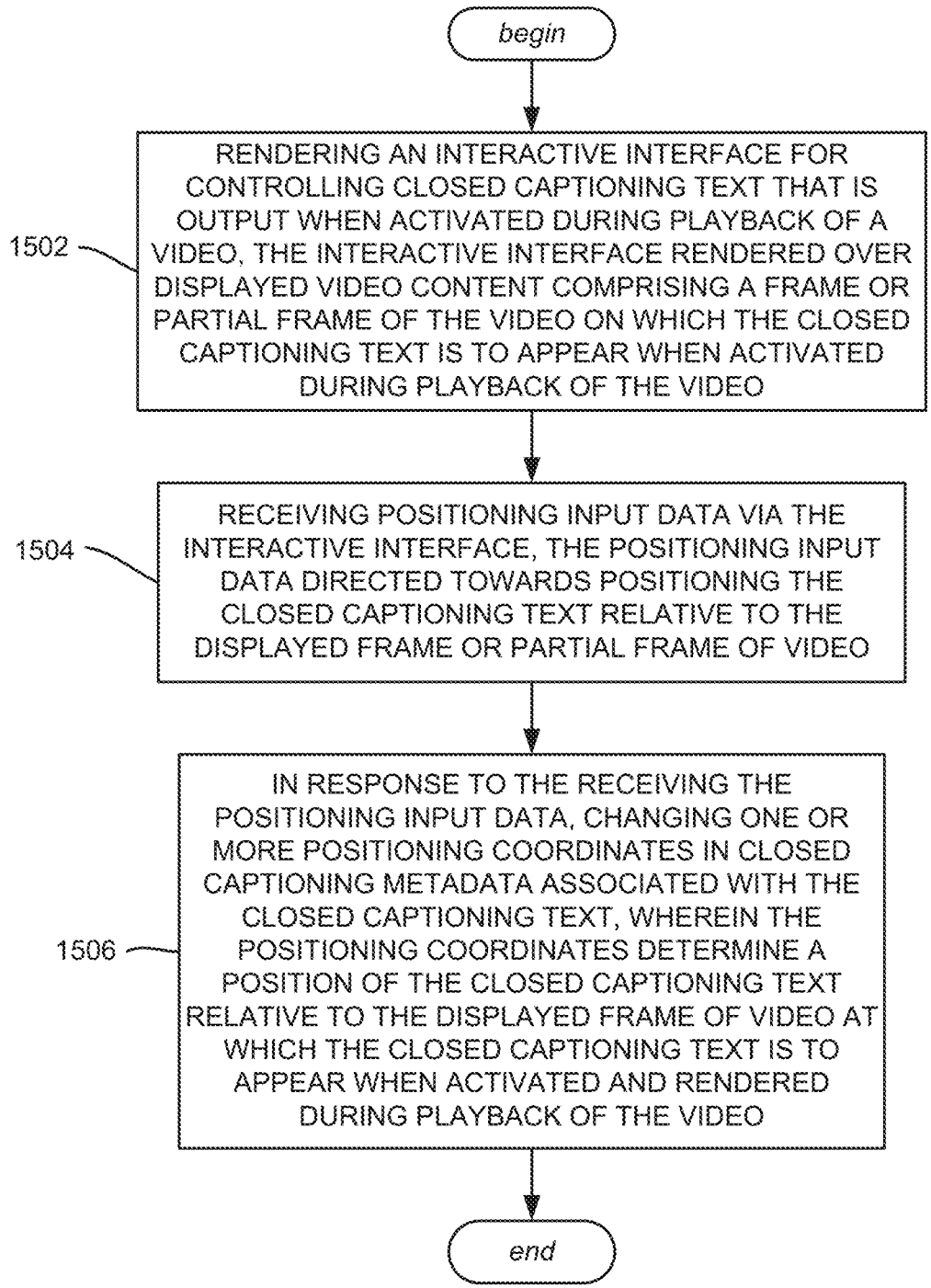
FIG. 15 comprises a flow diagram showing example logic/operations corresponding to caption editing operations including handling (e.g., processing) caption positioning metadata, according to one or more example implementations.

One or more aspects, summarized in FIG. 15, are directed towards rendering (operation 1502) an interactive interface for controlling closed captioning text that is output when activated during playback of a video, the interactive interface rendered over displayed video content comprising a frame or partial frame of the video on which the closed captioning text is to appear when activated during playback of the video. Aspects can comprise receiving (operation 1504) positioning input data via the interactive interface, the positioning input data directed towards positioning the closed captioning text relative to the displayed frame or partial frame of video. In response to the receiving the positioning input data, aspects can comprise changing (operation 1506) one or more positioning coordinates in closed captioning metadata associated with the closed captioning text, wherein the positioning coordinates determine a position of the closed captioning text relative to the displayed frame of video at which the closed captioning text is to appear when activated and rendered during playback of the video.

Other aspects can comprise dynamically moving the interactive interface relative to the displayed frame or partial frame of video in response to the receiving the positioning input data.

Still other aspects can comprise receiving timing input data on the interactive interface, and in response to the receiving the timing input data, changing timing metadata associated with the closed captioning text in the closed captioning metadata and displaying video content comprising a changed frame or partial frame of video that corresponds to the changing the timing metadata. Receiving the timing input data can comprise changing a time range associated with closed captioning text in the closed captioning metadata.

Aspects can comprise receiving text editing information via the interactive interface, and in response to the receiving the text editing information, editing the closed captioning text. Editing the closed captioning text can comprise changing caption text content of the closed captioning text. Editing the closed captioning text can comprise changing caption text metadata corresponding to a style of caption text content of the closed captioning text.

Other aspects can comprise maintaining a counter corresponding to how many more characters of caption text content are able to be entered relative to a limit, and rendering a representation of the counter in conjunction with the interactive interface.

Still other aspects can comprise rendering an interactive search menu, the interactive search menu comprising a search input element for entering text to search within a group of closed captions associated with the video.

Figure 16:
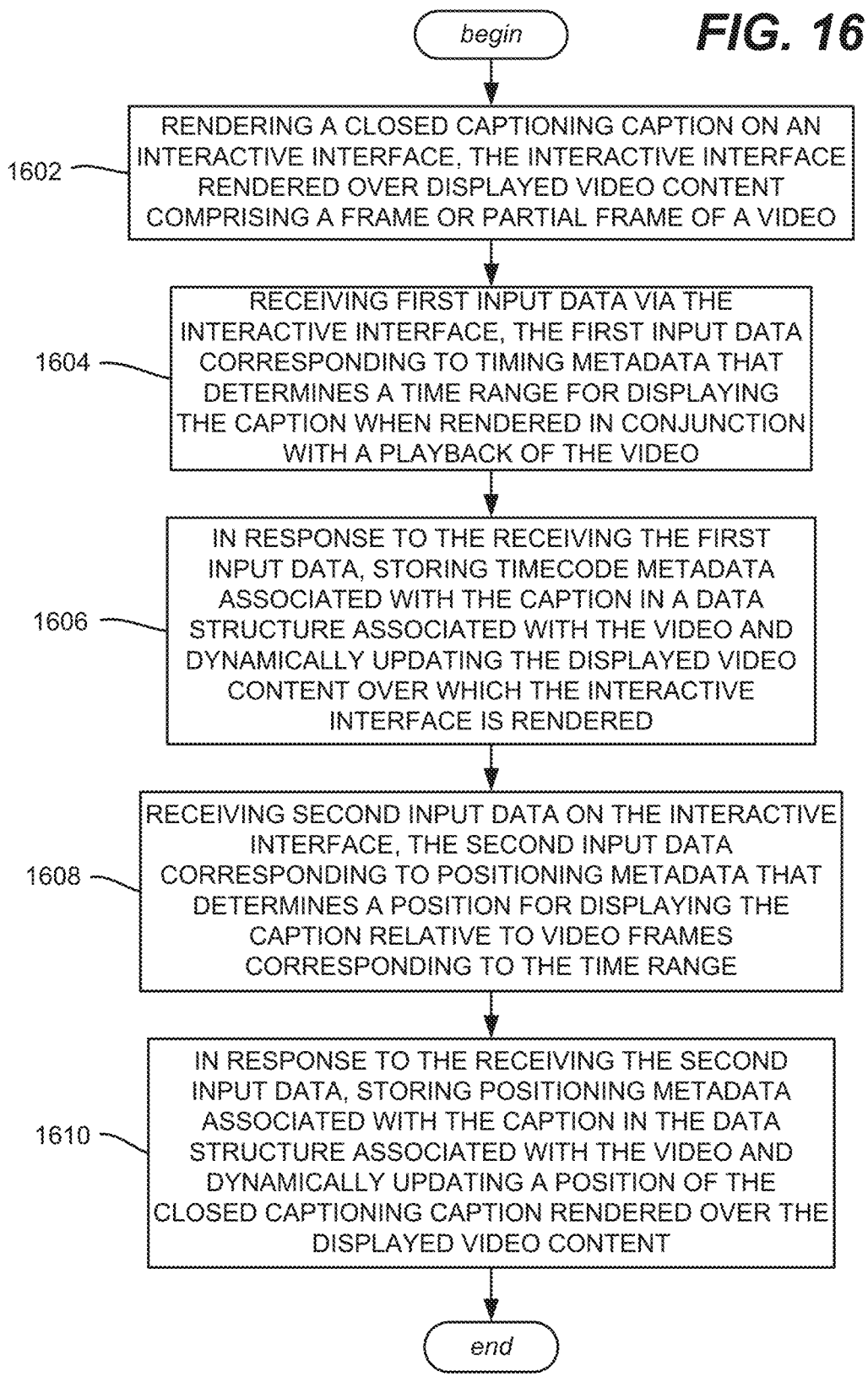
FIG. 16 comprises a flow diagram showing example logic/operations corresponding to caption editing operations including handling (e.g., processing) caption positioning metadata and caption timing metadata, according to one or more example implementations.

Other aspects are summarized with reference to FIG. 16, and, for example, can correspond to operations, such as performed on a machine-readable storage medium, comprising executable instructions that, when executed by a processor facilitate performance of the operations. Operations can comprise rendering (operation 1602) a closed captioning caption on an interactive interface, the interactive interface rendered over displayed video content comprising a frame or partial frame of a video. Other operations can comprise receiving (operation 1604) first input data via the interactive interface, the first input data corresponding to timing metadata that determines a time range for displaying the caption when rendered in conjunction with a playback of the video, and in response to the receiving the first input data, storing (operation 1606) timecode metadata associated with the caption in a data structure associated with the video and dynamically updating the displayed video content over which the interactive interface is rendered. Other operations can comprise receiving (operation 1608) second input data on the interactive interface, the second input data corresponding to positioning metadata that determines a position for displaying the caption relative to video frames corresponding to the time range, and in response to the receiving the second input data, storing (operation 1610) positioning metadata associated with the caption in the data structure associated with the video and dynamically updating a position of the closed captioning caption rendered over the displayed video content.

Further operations can comprise receiving third input data via the interactive interface, the third input data corresponding to caption text style metadata that determines a style of at least part of the caption text when rendered in conjunction with a playback of the video, and in response to the receiving the third input data, storing text content style metadata associated with the caption in a data structure associated with the video, and dynamically the style of at least part of the caption text of the rendered closed captioning caption.

Further operations can comprise receiving third input data via the interactive interface, the third input data corresponding to caption text editing data that determines the caption text when rendered in conjunction with a playback of the video, and in response to the receiving the third input data, storing text content data associated with the caption in a data structure associated with the video, and dynamically updating rendered text content of the closed captioning caption. Still further operations can comprise maintaining a counter corresponding to how many more characters of caption text content data are able to be entered relative to a character count limit, and further comprising, rendering a representation of the counter in conjunction with the interactive interface.

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 18 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 17:
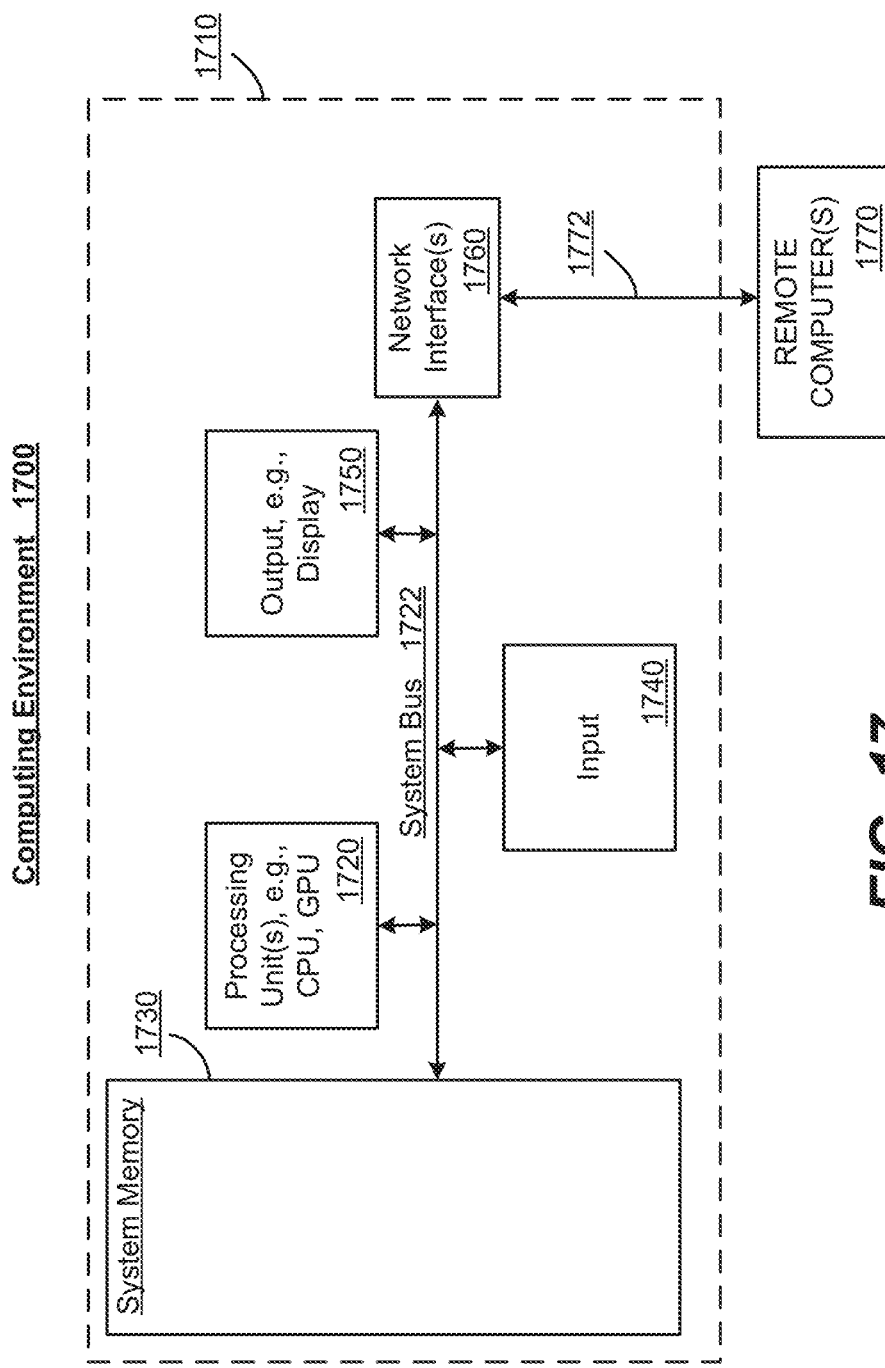
FIG. 17 is a block diagram representing an example computing environment into which aspects of the subject matter described herein may be incorporated.

FIG. 17 thus illustrates an example of a suitable computing system environment 1700 in which one or aspects of the implementations described herein can be implemented, although as made clear above, the computing system environment 1700 is only one example of a suitable computing environment and is not intended to suggest any limitation as to scope of use or functionality. In addition, the computing system environment 1700 is not intended to be interpreted as having any dependency relating to any one or combination of components illustrated in the example computing system environment 1700.

With reference to FIG. 17, an example device for implementing one or more implementations includes a general purpose computing device in the form of a computer 1710. Components of computer 1710 may include, but are not limited to, a processing unit 1720, a system memory 1730, and a system bus 1722 that couples various system components including the system memory to the processing unit 1720.

Computer 1710 typically includes a variety of machine (e.g., computer) readable media and can be any available media that can be accessed by a machine such as the computer 1710. The system memory 1730 may include computer storage media in the form of volatile and/or nonvolatile memory such as read only memory (ROM) and/or random access memory (RAM), and hard drive media, optical storage media, flash media, and so forth. By way of example, and not limitation, system memory 1730 may also include an operating system, application programs, other program modules, and program data.

A user can enter commands and information into the computer 1710 through one or more input devices 1740. A monitor or other type of display device is also connected to the system bus 1722 via an interface, such as output interface 1750. In addition to a monitor, computers can also include other peripheral output devices such as speakers and a printer, which may be connected through output interface 1750.

The computer 1710 may operate in a networked or distributed environment using logical connections to one or more other remote computers, such as remote computer 1770. The remote computer 1770 may be a personal computer, a server, a router, a network PC, a peer device or other common network node, or any other remote media consumption or transmission device, and may include any or all of the elements described above relative to the computer 1710. The logical connections depicted in FIG. 17 include a network 1772, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising, a processor; and a memory that stores executable instructions that, when executed by the processor, facilitate performance of operations, the operations comprising:

rendering an interactive interface for editing closed captioning captions, the interactive interface rendered over displayed video content comprising a frame or partial frame of a video on which a caption being edited via the interactive interface is to appear during playback of the video, the interactive interface comprising a timing element that, upon actuation, displays as the displayed video content an initial frame on which the caption appears receiving caption editing input data via the interactive interface with respect to the caption being edited, the editing input data corresponding to positioning metadata of the caption, timing metadata of the caption, or a text-related action corresponding to text content of the caption, and in response to the receiving the caption editing input data, changing metadata or data associated with the caption.

2. The system of claim 1 wherein the receiving the caption editing input data via the interactive interface comprises receiving positioning interaction input data corresponding to the positioning metadata of the caption, and further comprising, dynamically moving the interactive interface relative to the displayed video content in response to the receiving the positioning interaction input data to render the caption at a relative actual location at which the caption is to appear during playback of the video.

3. The system of claim 1 wherein the receiving the caption editing input data via the interactive interface comprises receiving timing interaction input data corresponding to the timing metadata of the caption, and further comprising, dynamically changing the displayed video content in response to the receiving the timing interaction input data.

4. The system of claim 1 wherein the receiving the caption editing input data via the interactive interface comprises receiving text-related input data corresponding to the text content of the caption, and further comprising, dynamically changing the displayed text content in response to the receiving the text-related input data.

5. The system of claim 4 wherein the receiving the caption editing input data comprises receiving text content style metadata corresponding to a selected portion of the text content.

6. The system of claim 4 wherein the receiving the caption editing input data comprises receiving a change to the text content, and further comprising, maintaining a counter corresponding to how many more characters of text content are able to be entered relative to a limit, and rendering the counter in conjunction with the interactive interface.

7. The system of claim 1, further comprising rendering an interactive search menu, the interactive search menu comprising a search input element for entering text to search within a group of closed captions associated with the video.

8. A computer-implemented method, comprising:
rendering an interactive interface for controlling closed captioning text that is output when activated during playback of a video, the interactive interface rendered over displayed video content comprising a frame or partial frame of the video on which the closed captioning text is to appear when activated during playback of the video, the interactive interface comprising a timing element that, upon actuation, displays as the displayed video content a final frame on which the caption appears;
receiving positioning input data via the interactive interface, the positioning input data directed towards positioning the closed captioning text relative to the displayed frame or partial frame of video; and
in response to the receiving the positioning input data, changing one or more positioning coordinates in closed captioning metadata associated with the closed captioning text, wherein the positioning coordinates determine a position of the closed captioning text relative to the displayed frame of video at which the closed captioning text is to appear when activated and rendered during playback of the video.

9. The computer-implemented method of claim 8, further comprising dynamically moving the interactive interface relative to the displayed frame or partial frame of video in response to the receiving the positioning input data.

10. The computer-implemented method of claim 8, further comprising receiving timing input data on the interactive interface, and in response to the receiving the timing input data, changing timing metadata associated with the closed captioning text in the closed captioning metadata and displaying video content comprising a changed frame or partial frame of video that corresponds to the changing the timing metadata.

11. The computer-implemented method of claim 10, wherein the receiving the timing input data comprises changing a time range associated with closed captioning text in the closed captioning metadata.

12. The computer-implemented method of claim 8, further comprising receiving text editing information via the interactive interface, and in response to the receiving the text editing information, editing the closed captioning text.

13. The computer-implemented method of claim 12, wherein the editing the closed captioning text comprises changing caption text content of the closed captioning text.

14. The computer-implemented method of claim 12, wherein the editing the closed captioning text comprises changing caption text metadata corresponding to a style of caption text content of the closed captioning text.

15. The computer-implemented method of claim 8, further comprising maintaining a counter corresponding to how many more characters of caption text content are able to be entered relative to a limit, and rendering the counter in conjunction with the interactive interface.

16. The computer-implemented method of claim 8, further comprising rendering an interactive search menu, the interactive search menu comprising a search input element for entering text to search within a group of closed captions associated with the video.

17. A non-transitory machine-readable storage medium, comprising executable instructions that, when executed by a processor facilitate performance of operations, the operations comprising:
rendering a closed captioning caption on an interactive interface, the interactive interface rendered over displayed video content comprising a frame or partial frame of a video, the interactive interface comprising a timing element that, when selected and moved, displays as the displayed video content an intermediate frame on which the caption appears;
receiving first input data via the interactive interface, the first input data corresponding to timing metadata that determines a time range for displaying the caption when rendered in conjunction with a playback of the video;
in response to the receiving the first input data, storing timecode metadata associated with the caption in a data structure associated with the video and dynamically updating the displayed video content over which the interactive interface is rendered;
receiving second input data on the interactive interface, the second input data corresponding to positioning metadata that determines a position for displaying the caption relative to video frames corresponding to the time range; and
in response to the receiving the second input data, storing positioning metadata associated with the caption in the data structure associated with the video and dynamically updating a position of the closed captioning caption rendered over the displayed video content.

18. The one or more non-transitory machine-readable storage media of claim 17 wherein the operations further comprise, receiving third input data via the interactive interface, the third input data corresponding to caption text style metadata that determines a style of at least part of the caption text when rendered in conjunction with a playback of the video, and in response to the receiving the third input data, storing text content style metadata associated with the caption in a data structure associated with the video, and dynamically the style of at least part of the caption text of the rendered closed captioning caption.

19. The one or more non-transitory machine-readable storage media of claim 17, wherein the operations further comprise receiving third input data via the interactive interface, the third input data corresponding to caption text editing data that determines the caption text when rendered in conjunction with a playback of the video, and in response to the receiving the third input data, storing text content data associated with the caption in a data structure associated with the video, and dynamically updating rendered text content of the closed captioning caption.

20. The one or more non-transitory machine-readable storage media of claim 19, wherein the operations further comprise maintaining a counter corresponding to how many more characters of caption text content data are able to be entered relative to a character count limit, and further comprising, rendering the counter in conjunction with the interactive interface.

\* \* \* \* \*